Patented Jan. 7, 1947

UNITED STATES PATENT OFFICE 2,413,691

PROCESS FOR THE PRODUCTION OF NEOHEXANE INVOLVING CATALYTIC ISOMERIZATION

Chester C. Crawford, El Cerrito, William E. Ross, Berkeley, and Sumner H. McAllister, Lafayette, Calif., assignors to Shell Development Company, San Francisco, Calif., a corporation of Delaware No Drawing. Application August 11, 1941, Serial No. 406,406

12 Claims. (Cl. 260—683.5)

The present invention relates to the production of 2,2,-dimethyl butane, hereinafter referred to as neohexane.

Neohexane is a particularly desirable hydrocarbon and is in great demand as a blending material in the production of the finest grade gasolines, particularly for aviation. The exceptional value of this material as a fuel component lies not only in its high octane rating (96), but more particularly in its volatility, high blending value, and exceptionally high lead susceptibility. This compound does not occur naturally in any appreciable quantities and is not found in any of the available petroleum fractions in concentrations sufficiently high to warrant its separation and recovery.

According to the process of the present invention, neohexane is produced from normal hexane by means of catalytic isomerization. It has long been known that various saturated hydrocarbons, including butane, pentane, hexane, etc., when treated under certain conditions in the presence of certain catalysts of the Friedel-Crafts type, are isomerized to their respective branched chain isomers. Thus, normal butane may be isomerized to an approximately equilibrium mixture of normal butane and isobutane. Normal pentane may be isomerized largely to isopentane. Normal hexane may be isomerized to methyl pentane and isomerized to a small extent to 2,3-dimethyl butane. These various isomerizations have been the subject of much investigation and study. As a result of these various investigations, it is the prevalent belief of those conversant with this art that as a general rule catalytic isomerization does not lead to the formation of isomers containing gem. methyl groups. The production of 2,2-dimethyl butane (neohexane) from normal hexane by isomerization has, as far as we are aware, never been hitherto accomplished.

It is well known that isomerization catalysts such as aluminum chloride, besides catalyzing isomerization, also exert strong catalytic influences on other reactions. Aluminum chloride, for example, is one of the most powerful cracking and polymerization catalysts known. Under the influence of these catalysts, butane has but one probable mode of scission. This hydrocarbon is therefore relatively stable in the presence of these catalysts and may be isomerized under relatively severe conditions. The higher paraffin hydrocarbons, on the other hand, have a plurality of probable modes of scission. These hydrocarbons are much more prone to undergo degradation under the influence of these catalysts. Pentane, for example, is 27%–40% degraded to lower and higher molecular weight products at 40° C., and is appreciably degraded even at room temperature (J. A. C. S. 58 1944 (1936)). Hexane is 20% to 25% degraded at only 69° C.–72° C. (Ind. Eng. Chem. 28 461 (1936)). In view of the great tendency for hexane to undergo degradation under the influences of isomerization catalysts, the treatment of this hydrocarbon with these catalysts to effect isomerization has always been executed under very mild conditions. The isomerization of hexane to neohexane is, however, a relatively deep-seated reaction, requiring relatively severe conditions, and under the conditions hitherto employed little or no neohexane is formed.

It has now been found that, contrary to general belief, a compound containing gem. methyl groups, namely neohexane, may be produced from hexane in substantial yields by catalytic isomerization under certain practical conditions. In our copending application, Serial No. 396,252, filed June 2, 1941, of which the present application is a continuation-in-part, we have described a process for the isomerization of paraffin hydrocarbons wherein the degradation reactions which normally take place are repressed by effecting the isomerization in the presence of certain cycloparaffin hydrocarbons. It is shown in said copending application that certain cycloparaffin hydrocarbons unexpectedly and quite efficiently repress degradation of the higher paraffin hydrocarbons and allow the isomerization of such easily degradable hydrocarbons as hexane to be effected under relatively severe conditions. Use is made of this discovery in the present process to produce neohexane from hexane by isomerization under conditions which, in the absence of the degradation inhibitor, would normally lead to excessive amounts of degradation. The process of the present invention in its broader aspect, therefore, consists of isomerizing hexane in the presence of degradation inhibitors under conditions conducive to the formation of neohexane.

According to the process of the present invention, the preferred starting material is normal hexane. Isohexane, although a less preferred starting material, may also be used. The hexane or a mixture of hexanes used for the production of neohexane, according to the process of the invention, is preferably substantially free of higher paraffins. Pentane, likewise, is somewhat detrimental and is preferably substantially absent. Butane and/or isobutane may, however, be present in any concentrations. As is well known, aromatic hydrocarbons and olefins are detrimental in the isomerization of saturated hydrocarbons with Friedel-Crafts type catalysts. These hydrocarbons, as well as other detrimental impurities, if present to any substantial extent in the hexane to be treated, are preferably removed prior to the treatment.

In order to inhibit degradation of the hexane and neohexane under conditions conducive to neohexane formation, the isomerization is effected in the presence of a suitable inhibitor. Preferred inhibitors comprise cycloparaffin hydrocarbons such, in particular, as cyclopentane, cyclohexane and their methylated derivatives. Those containing from 5 to 8 carbon atoms are, in general, preferred. These cycloparaffin inhibitors may be employed singly or in various mixtures. Preferred inhibitors, for example, comprise mixtures of isomers such as methyl cyclopentane-cyclohexane, dimethyl cyclopentane-methyl cyclohexane, and the like. These mixtures may be substantially at equilibrium, in which case no appreciable isomerization of them takes place in the isomerization process. The cycloparaffin inhibitor, according to the present process, may be present in the reaction mixture in a considerable range of concentrations. In certain cases, concentrations as low as 1% may be effective. In general, however, concentrations between about 3% and 25% are preferred. Higher concentrations, for instance in the order of 40%–50%, are applicable but the presence of such large concentrations of diluent is usually less economical in practice. The cycloparaffin inhibitor is preferably introduced into the reaction zone with the hexane feed. It may, however, be introduced as a separate stream, if desired. If relatively large concentrations of cycloparaffin inhibitor are employed, the cycloparaffin may be recovered from the product and recycled through the reaction zone. If desired, however, smaller quantities of cycloparaffin inhibitor may be employed and the recycling step omitted.

The process of the invention may be effected with any of the isomerization catalysts of the Friedel-Crafts type such as those disclosed in United States Patents 2,169,494, 2,216,221, 2,208,-362, 2,223,180, and 2,225,776. Of these various catalysts, aluminum chloride and/or aluminum bromide are preferred. The catalyst may be employed in any one of several forms. For example, it may be suspended in the reacting mixture or in one of the organo-aluminum halide complexes as a fine slurry, or may be impregnated in a suitable carrier material such as activated carbon, activated alumina, activated bauxite, activated magnesia, activated clay or the like. The catalyst is preferably employed, however, in the liquid state, for instance, as a solution of aluminum chloride or aluminum bromide in a molten salt mixture. Active and efficient catalysts for the process, for example, may consist of molten mixtures comprising aluminum chloride and/or aluminum bromide with other metal halides such as the halides of Li, Na, K, Cu, Be, Mg, Zn, Cd, Ti, Zr, Sn, Pb, V, As Sb Bi, Fe, Co, and Ni. Certain of these metal halides such as those of Li, Na, K, etc., react with aluminum chloride and/or aluminum bromide to form complex double compounds. When these metal halides which react with the aluminum chloride or aluminum bromide are present in the catalyst, the aluminum chloride and/or bromide is preferably in substantial excess, thus insuring the presence of free aluminum chloride and/or bromide in the molten catalyst mixture. Exceptionally suitable catalysts of this type are described in copending application, Serial No. 363,676, filed October 31, 1940.

The isomerization conditions required for the production of neohexane are considerably more severe than those usually employed for the isomerization of normal hexane to isohexane. The factors controlling the severity of the conditions are the activity of the catalyst, the temperature of operation, the concentration of promoter employed, and the contact time. Pressure has relatively little effect in the liquid phase operation. The contact time is a function of two variables, namely, the efficiency of the contact and the time of contact. The former of these is a function of the physical state of the catalyst and the amount of catalyst. These various factors are interdependent. Thus, the optimum temperature depends upon the activity of the catalyst, the concentration of promoter, and the contact time. The optimum contact time depends upon the catalyst, temperature and concentration of promoter. In general, the process requires temperatures in the range of about 60° C. to about 120° C. By properly adjusting other variables, however, temperatures somewhat above and below this range may be employed. The conversions to neohexane, other things being equal, depend considerably upon the concentration of promoter employed. Although various promoters such as alkyl halides, boron halides, and the like may be employed, the preferred promoters from the economical point of view are the hydrogen halides such, in particular, as hydrogen chloride. The conversions to neohexane, other things being equal, are more or less proportional to the concentration of promoter employed up to a more or less practical limit of concentrations, beyond which decreased conversions due to excess in dilution are observed. In general, concentration of hydrogen chloride in the order of from about 2% to about 10% b. w. of the hydrocarbon feed are suitable.

The conversions to neohexane, other things being equal, increase with the contact time and then decrease when the contact time is sufficiently long to allow substantial degradation. The contact time, as stated above, is a function of the efficiency of the contact and the time of contact. It therefore depends upon the physical state of the catalyst, i. e. whether it is a liquid or a solid, and if it is a solid, its state of subdivsion and porosity, and if it is a liquid, its viscosity, degree of agitation and the ratio of the hydrocarbon phase to the catalyst phase. When employing the preferred molten salt type catalysts, for instance, in a mixer type reactor and phase ratios of hydrocarbon to catalyst of from about 1.5:1 to 10:1 and temperatures in the range of 60° C. to 90° C. and concentrations of hydrogen chloride promoter in the order of about 3%–4%, excellent conversions may be maintained with contact times between about 5 and 40 minutes.

The effects of certain of these variables are shown in the following illustrative examples. These examples are not intended to limit the invention in any way.

*Example 1*

Normal hexane was contacted in the liquid phase with an agitated fluid catalyst consisting essentially of 88.1% $SbCl_3$, 10.8% $AlCl_3$ and 1.1% NaCl. In order to inhibit degradation of the normal hexane, the treatment was executed in the presence of 36% by volume methyl cyclopentane in the hydrocarbon phase. The other conditions were as follows:

Temperature: 70° C.
Promoter: HCl 2.0%–2.5% by weight of hydrocarbon feed
Contact time: 30 minutes
Phase ratio, hydrocarbon catalyst: About 5:1
Substantially no cracking to isobutane took place.

The conversion of normal hexane to neohexane was about 4%. From this experiment it is seen that under the described conditions substantially no neohexane is formed at contact times less than about 30 minutes. It is to be pointed out, however, that this conclusion is valid only for the conditions specified and it does not hold if, for instance, the degree of contact is materially increased as, for instance, by materially increasing the rate of mixing of the ratio of hydrocarbon and catalyst phases. Satisfactory conversions to neohexane can also be obtained at contact times of 30 minutes or even less by increasing the severity of one or more of the other conditions. Thus, other conditions being equal, with a contact time of 30 minutes and a temperature of 80° C. the conversion to neohexane is increased to about 16% or if the ratio of the hydrocarbon phase to the catalyst phase is decreased to 2.5:1, other things being equal, the conversion of normal hexane to neohexane is increased to about 39%.

Example II

Normal hexane was contacted with a stirred fluid catalyst of the composition shown in Example I for a contact time of 30 minutes in the presence of various concentrations of hydrogen chloride promoter. In order to inhibit the degradation which would normally take place, the treatment was effected in the presence of 36% by volume methyl cyclopentane in the hydrocarbon phase. The ratio of the hydrocarbon phase to the catalyst phase was about 5:1. No cracking to isobutane took place. The conversions to neohexane were as follows:

| Promoter, per cent by weight of hydrocarbon feed | Conversion normal hexane to neohexane |
| --- | --- |
| 0 | Substantially none. |
| 1.0 | 15%. |
| 3.7 | 43%. |

It is seen from these experiments that under these conditions the best yields of neohexane are obtained with fairly large concentrations of promoter.

If the concentration of hydrogen halide promoter is adjusted to 2% and the contact time is increased to 45 minutes, the conversion to neohexane is approximately 40%.

Example III

Normal hexane was isomerized with a stirred fluid catalyst consisting essentially of 92.5% by weight SbCl₃ and 7.5% by weight AlCl₃ under the following conditions:

Temperature: 80° C.
Contact time: 30 minutes
Promoter: HCl, 4.2% by weight of hydrocarbon feed
Ratio of hydrocarbon phase to catalyst phase: About 5:1

The degradation which would normally take place under these relatively severe conditions was substantially inhibited by effecting the isomerization in the presence of 4.8% of methyl cyclopentane in the hydrocarbon phase. The normal hexane was converted to 8.1% isobutane and 39% neohexane.

When the above experiment was repeated using a larger amount of the methyl cyclopentane inhibitor, namely, 13.2%, the conversions to isobutane and neohexane were 1.4% and 30%, respectively.

Example IV

Normal hexane was contacted with stirring with a fluid catalyst conssiting essentially of the composition shown in Example I under the following conditions:

Temperature: 70° C.
Contact time: 30 minutes
Promoter: HCl, 2% by weight of hydrocarbon feed
Ratio of hydrocarbon phase to catalyst phase: 2.5:1

Pure hexane under these conditions undergoes extensive decomposition. In order to inhibit this decomposition and allow the formation of neohexane, the isomerization was effected in the presence of 36% methyl cyclopentane in the hydrocarbon phase. No hexane was degraded to isobutane and the conversion of normal hexane to neohexane was about 39%.

We claim as our invention:

1. A process for the production of neohexane which comprises isomerizing an open chain hexane devoid of a quaternary carbon atom in the substantial absence of higher paraffin hydrocarbons and in the presence of an amount between 3% and 50% of methyl cyclopentane sufficient to substantially inhibit degradation to isobutane with at least 10% by volume of a molten catalyst consisting essentially of about 92.5% by weight antimony trichloride and 7.5% by weight aluminum chloride promoted with between about 2% and 10% of hydrogen chloride at a temperature between 65° C. and 120° C. and a contact time less than 40 minutes sufficient to effect at least 15% conversion of the hexane applied to neohexane, and separating a fraction consisting essentially of neohexane from the product by fractional distillation.

2. A process for the production of neohexane which comprises isomerizing isohexane (methyl pentane) in the substantial absence of higher paraffin hydrocarbons and in the presence of an amount between 3% and 50% of methyl cyclopentane sufficient to substantially inhibit degradation to isobutane with at least 10% by volume of a molten salt mixture containing free aluminum chloride and between about 2% and 10% of hydrogen chloride at a temperature between 65° C. and 120° C. and a contact time less than 40 minutes sufficient to effect at least 15% conversion of the hexane applied to neohexane, and separating a fraction consisting essentially of neohexane from the product by fractional distillation.

3. A process for the production of neohexane which comprises isomerizing normal hexane in the substantial absence of higher paraffin hydrocarbons and in the presence of an amount between 3% and 50% of methyl cyclopentane sufficient to substantially inhibit degradation to isobutane with at least 10% by volume of a molten salt mixture containing free aluminum chloride and between about 2% and 10% of hydrogen chloride at a temperature between 65° C. and 120° C. and a contact time less than 40 minutes sufficient to effect at least 15% conversion of the hexane applied to neohexane, and separating a fraction consisting essentially of neohexane from the product by fractional distillation.

4. A process for the production of neohexane which comprises isomerizing isohexane (methyl pentane) in the substantial absence of higher paraffin hydrocarbons and in the presence of an amount between 3% and 50% of methyl cyclopentane sufficient to substantially inhibit degradation to isobutane with at least 10% by volume of an aluminum chloride isomerization catalyst containing free aluminum chloride and between about 2% and 10% of hydrogen chloride at a temperature between 65° C. and 120° C. and a contact time less than 40 minutes sufficient to effect at least 15% conversion of the hexane applied to neohexane, and separating a fraction consisting essentially of neohexane from the product by fractional distillation.

5. A process for the production of neohexane which comprises isomerizing normal hexane in the substantial absence of higher paraffin hydrocarbons and in the presence of an amount between 3% and 50% of methyl cyclopentane sufficient to substantially inhibit degradation to isobutane with at least 10% by volume of an aluminum chloride isomerization catalyst containing free aluminum chloride and between about 2% and 10% of hydrogen chloride at a temperature between 65° C. and 120° C. and a contact time less than 40 minutes sufficient to effect at least 15% conversion of the hexane applied to neohexane, and separating a fraction consisting essentially of neohexane from the product by fractional distillation.

6. A process for the production of neohexane which comprises isomerizing isohexane (methyl pentane) in the substantial absence of higher paraffin hydrocarbons and in the presence of an amount between 3% and 50% of a cycloparaffin hydrocarbon containing from 5 to 8 carbon atoms sufficient to substantially inhibit degradation to isobutane with at least 10% by volume of a molten salt mixture containing free aluminum chloride and between about 2% and 10% of hydrogen chloride at a temperature between 65° C. and 120° C. and a contact time less than 40 minutes sufficient to effect at least 15% conversion of the hexane applied to neohexane, and separating a fraction consisting essentially of neohexane from the product by fractional distillation.

7. A process for the production of neohexanes which comprises isomerizing normal hexane in the substantial absence of higher paraffin hydrocarbons and in the presence of an amount between 3% and 50% of a cycloparaffin hydrocarbon containing from 5 to 8 carbon atoms sufficient to substantially inhibit degradation to isobutane with at least 10% by volume of a molten salt mixture containing free aluminum chloride and between about 2% and 10% of hydrogen chloride at a temperature between 65° C. and 120° C. and a contact time less than 40 minutes sufficient to effect at least 15% conversion of the hexane applied to neohexane, and separating a fraction consisting essentially of neohexane from the product by fractional distillation.

8. A process for the production of neohexane which comprises isomerizing an open chain hexane devoid of a quaternary carbon atom in the substantial absence of higher paraffin hydrocarbons and in the presence of an amount between 3% and 50% of methyl cyclopentane sufficient to substantially inhibit degradation to isobutane with at least 10% by volume of an aluminum chloride isomerization catalyst containing free aluminum chloride and between about 2% and 10% of hydrogen chloride at a temperature between 65° C. and 120° C. and a contact time less than 40 minutes sufficient to effect at least 15% conversion of the hexane applied to neohexane, and separating a fraction consisting essentially of neohexane from the product by fractional distillation.

9. A process for the production of neohexane which comprises isomerizing an open chain hexane devoid of a quaternary carbon atom in the substantial absence of higher paraffin hydrocarbons and in the presence of an amount between 3% and 50% of a cycloparaffin hydrocarbon containing from 5 to 8 carbon atoms sufficient to substantially inhibit degradation to isobutane with at least 10% by volume of a molten salt mixture containing free aluminum chloride and between about 2% and 10% of hydrogen chloride at a temperature between 65° C. and 120° C. and a contact time less than 40 minutes sufficient to effect at least 15% conversion of the hexane applied to neohexane, and separating a fraction consisting essentially of neohexane from the product by fractional distillation.

10. A process for the production of neohexane which comprises isomerizing isohexane (methyl pentane) in the substantial absence of higher paraffin hydrocarbons and in the presence of an amount between 3% and 50% of a cycloparaffin hydrocarbon containing from 5 to 8 carbon atoms sufficient to substantially inhibit degradation to isobutane with at least 10% by volume of an aluminum chloride isomerization catalyst contaning free aluminum chloride and between about 2% and 10% of hydrogen chloride at a temperature between 65° C. and 120° C. and a contact time less than 40 minutes sufficient to effect at least 15% conversion of the hexane applied to neohexane, and separating a fraction consisting essentially of neohexane from the product by fractional distillation.

11. A process for the production of neohexane which comprises isomerizing normal hexane in the substantial absence of higher paraffin hydrocarbons and in the presence of an amount between 3% and 50% of a cycloparaffin hydrocarbon containing from 5 to 8 carbon atoms sufficient to substantially inhibit degradation to isobutane with at least 10% by volume of an aluminum chloride isomerization catalyst containing free aluminum chloride and between about 2% and 10% of hydrogen chloride at a temperature between 65° C. and 120° C. and a contact time less than 40 minutes sufficient to effect at least 15% conversion of the hexane applied to neohexane, and separating a fraction consisting essentially of neohexane from the product by fractional distillation.

12. A process for the production of neohexane which comprises isomerizing an open chain hexane devoid of a quaternary carbon atom in the substantial absence of higher paraffin hydrocarbons and in the presence of an amount between 3% and 50% of a cycloparaffin hydrocarbon containing from 5 to 8 carbon atoms sufficient to substantially inhibit degradation to isobutane with at least 10% by volume of an aluminum chloride isomerization catalyst containing free aluminum chloride and between about 2% and 10% of hydrogen chloride at a temperature between 65° C. and 120° C. and a contact time less than 40 minutes sufficient to effect at least 15% conversion of the hexane applied to neohexane, and separating a fraction consisting essentially of neohexane from the product by fractional distillation.

CHESTER C. CRAWFORD.
WILLIAM E. ROSS.
SUMNER H. McALLISTER.